United States Patent
Puckette

[15] 3,659,209
[45] Apr. 25, 1972

[54] SLOPE POLARITY DETECTOR CIRCUIT

[72] Inventor: Charles McDonald Puckette, Scotia, N.Y.
[73] Assignee: General Electric Company
[22] Filed: Sept. 29, 1969
[21] Appl. No.: 861,821

[52] U.S. Cl. ............................328/132, 307/231, 328/147, 328/148, 328/150
[51] Int. Cl. .......................................................H03k 5/20
[58] Field of Search.................307/235, 236, 263, 229, 219, 307/215; 328/132, 135, 147, 148, 149, 146, 114, 117, 150

[56] References Cited

UNITED STATES PATENTS

| | | | |
|---|---|---|---|
| 3,278,753 | 10/1966 | Pitts et al. ............................ | 307/235 X |
| 3,116,458 | 12/1963 | Margopoulos ....................... | 328/148 X |
| 3,281,607 | 10/1966 | Gariano ................................ | 307/215 |
| 3,348,199 | 10/1967 | Jörgensen ........................... | 307/236 X |
| 3,463,939 | 8/1969 | Sturman .............................. | 307/235 |
| 3,497,817 | 2/1970 | Ellis ..................................... | 328/147 X |
| 3,508,158 | 4/1970 | Marchese........................... | 307/235 X |

OTHER PUBLICATIONS

Cackowski et al., " Pulse Detector," IBM Technical Disclosure P. 344– 345, Vol. 7, No. 5, Oct., 1964.
Marsoccl, " A Survey of Semiconductor Devices and Circuits in Computers," Semiconductor Products, Vol. 4, No. 1, p. 31, Jan. 1961.
Korn et al., Electronic Analog Computers, P. 172– 173, 2nd Edition, 1956, McGraw-Hill Book Company, Inc.

*Primary Examiner*—Donald D. Forrer
*Assistant Examiner*—L. N. Anagnos
*Attorney*—Paul A. Frank, John F. Ahern, Louis A. Moucha, Frank L. Neuhauser, Oscar B. Waddell and John B. Forman

[57] ABSTRACT

An electrical circuit for determining the polarity of the slope of an analog type voltage waveform includes a voltage comparator and time delay network providing a time delay of less than 0.05 times the period of one cycle of the voltage waveform being monitored. In a positive slope detector circuit, the analog input signal is supplied to the positive input terminal of the comparator and is also supplied through the time delay network to the negative input terminal. In a negative slope detector circuit, the time delay network is connected to the positive input terminal. A circuit including both the positive and negative slope detector circuits, and a logic gate connected to the outputs of the detector circuits, provides the function of a zero slope detector.

11 Claims, 6 Drawing Figures

Inventor:
Charles M. Puckette,

SLOPE POLARITY DETECTOR CIRCUIT

My invention relates to an electrical circuit for determining the polarity of the slope of an analog input voltage waveform, and in particular, to a circuit for detecting the zero slope of peaks of such waveform at the time of occurrence thereof.

There are many applications wherein it is necessary, or at least highly desirable, to detect the particular polarity slope of an analog input voltage waveform or to determine the zero slope point thereof which corresponds to the peak amplitude of such waveform. One particular application of the zero slope detector is in a synchronous data transmission system which requires a receiver time base waveform be automatically adjusted to sample the received input data at an optimum point. This automatic phasing of the time base waveform may be accomplished by sensing the location of the input data signal peaks and generating an error signal which is proportional to the time interval between the maximum amplitude (zero slope point) of the input data signal and the sampling time. The zero slope detector also finds application in a sample-and-hold technique in video detection wherein the object is to detect amplitude information on a carrier in AM transmission. In this latter application, the peak value of the sinusoidal carrier is detected and stored in a capacitor until the next peak occurs, the process continuing and thereby providing a stepped approximation of the envelope function.

Electrical circuits exist in the prior art which yield an output that is directly proportional to the derivative of an input function, however, these circuits suffer from bandwidth limitations as well as dynamic range problems. Other circuits such as disclosed in U.S. Pat. No. 3,334,298 Monrad-Krohn perform waveform detection based on a matched filter principle which is distinct from the subject invention. Therefore, the principal object of my invention is to provide an electrical circuit for determining the polarity of the slope of an analog input voltage waveform.

Another object of my invention is to provide an electrical circuit for determining the zero slope or peak amplitude point of the analog voltage waveform.

Briefly stated, my invention comprises a first electrical circuit including a first voltage comparator and first time delay network at an input thereof for providing a time delay of less than 0.05 times the period of one cycle of an analog input voltage waveform being monitored by the circuit. Depending upon the connection of the time delay network in the negative or positive input circuit of the comparator, the output of the comparator provides a positive or negative polarity slope detector function, respectively. A circuit including the positive and negative slope detectors connected in parallel, and a logic gate connected to the outputs of the comparators provides the function of a zero slope detector which indicates the peaks of the analog input voltage waveform.

The features of my invention which I desire to protect herein are pointed out with particularity in the appended claims. The invention, itself, however, both as to its organization and method of operation, together with further objects and advantages thereof, may best be understood by reference to the following description taken in connection with the accompanying drawings wherein like parts in each of the several figures are identified by the same character reference and wherein:

FIGS. 4 and 4A illustrate a detailed schematic diagram of a specific embodiment of the zero slope detector shown generally in FIG. 2.

Figure 1:
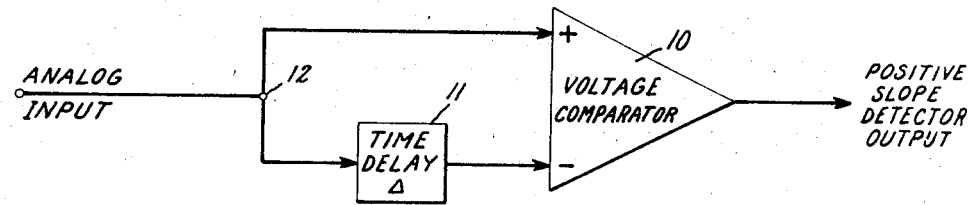
FIG. 1 is a simplified block diagram of a positive slope detector constructed in accordance with my invention.
Figure 3:
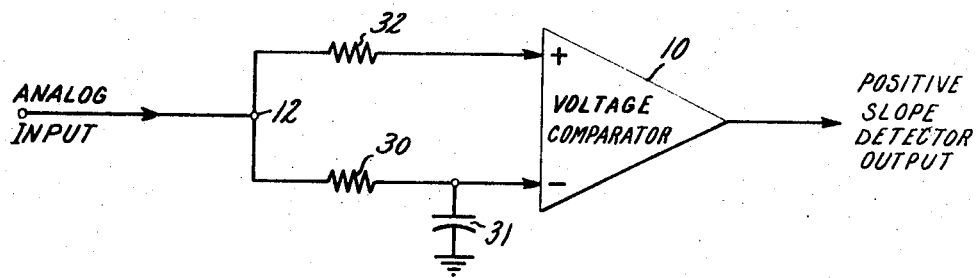
FIG. 3 is a schematic diagram of my positive slope detector illustrated in greater detail than in FIG. 1.
Figure 4:
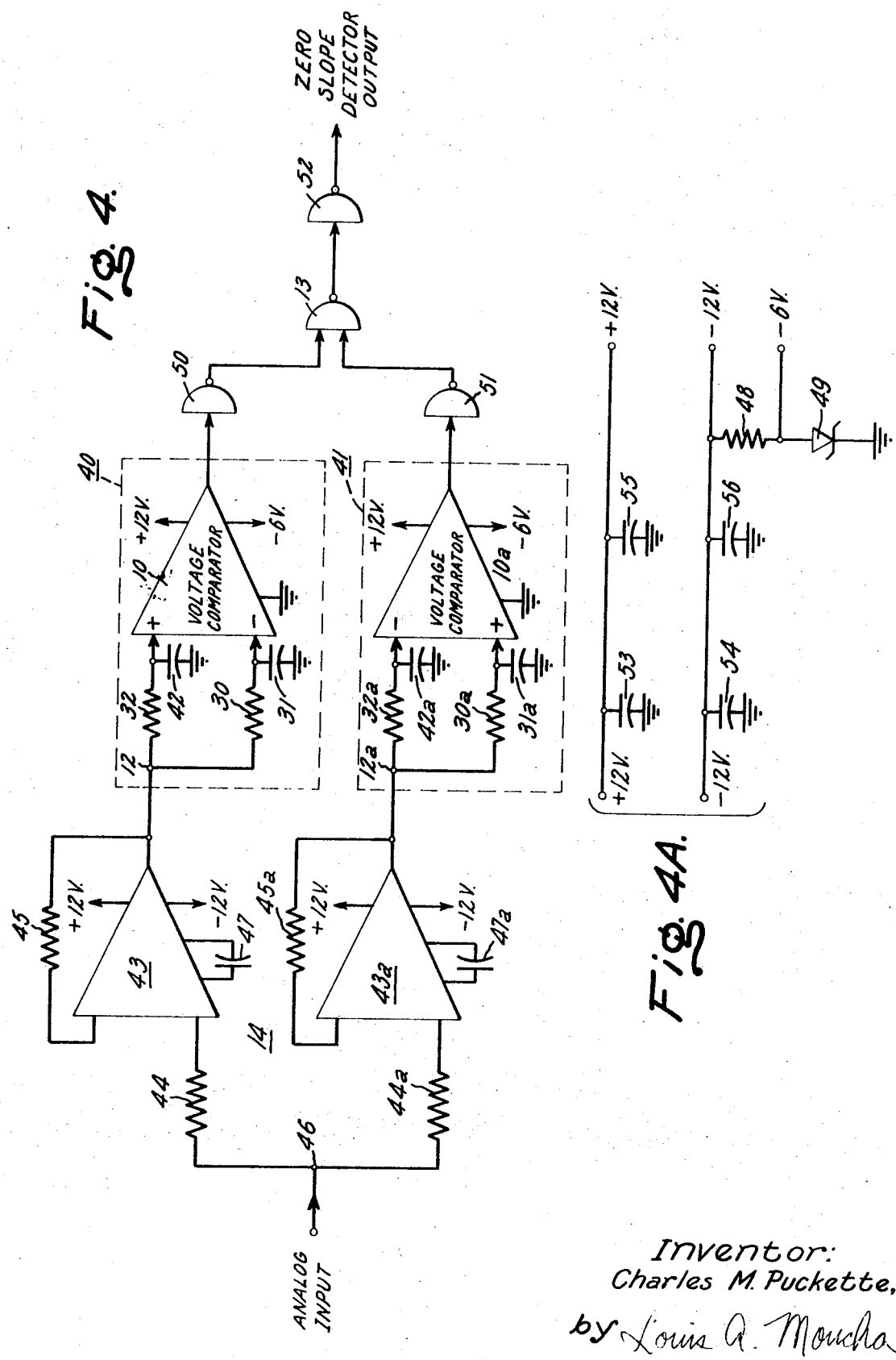

Referring now to FIG. 1, there is shown my positive slope detector in simplified block diagram form, the details thereof being more fully illustrated in FIG. 3 and completely illustrated in FIG. 4. As indicated in FIG. 1, my positive slope detector may be generally described as comprising a conventional differential voltage comparator 10 and an electrical time delay network 11 which provides a sufficiently small time delay $\Delta$ less than 0.05 times the period of one cycle of an analog input voltage waveform being monitored by the slope detector. It is important to use a differential voltage comparator instead of a differential amplifier for element 10 since the small time delay $\Delta$ may introduce problems involving gain levels and dynamic range in the latter.

The slope polarity detector, and the zero slope detector (FIG. 2), are capable of detecting, at the time of occurrence, the respective slope polarity and zero slope of the analog input voltage waveform wherein such input voltage is supplied to a first juncture 12 that provides connections to the positive (+) and negative (−) input terminals of the voltage comparator 10. As indicated in the positive slope detector of FIG. 1, the analog input voltage is supplied from an appropriate source (not shown) to juncture 12 and thence is transmitted directly to the (+) input terminal of voltage comparator 10, and through the time delay network 11 to the (−) input terminal. The slope detector functions in the following manner: The analog input signal is delayed a fixed short time by delay network 11 and thence compared with itself in an undelayed form in voltage comparator 10. Any difference between the magnitude of the two inputs (the delayed and undelayed input signal) is indicative of the slope polarity of the input signal. Thus, if the present signal, supplied to the (+) input terminal, is of greater magnitude than the delayed signal supplied to the (−) input terminal, the voltage comparator output assumes (i.e. high state indicating that the slope of the analog input voltage waveform is positive. Comparator 10, being a binary logic type device provides an output voltage of near zero (i.e. low state) for the condition of a net negative input voltage supplied to the input terminals and, conversely, a net positive input voltage supplied to such terminals causes the output to switch to a positive voltage of substantial magnitude i.e., high state). These low and high state outputs represent the binary logic ZERO and ONE, respectively.

The operation of the positive slope detector may also be described mathematically as follows, assuming the analog input voltage is of the form:

$$x(t) = A \sin \omega t \qquad (1)$$

The net input, $E_i$, to the comparator at the terminals thereof may be expressed as:

$$E_i = A \sin \omega t - A \sin(\omega[t - \Delta]) \qquad (2)$$

Equation (2) may be rewritten as:

$$E_i = A \sin \omega t (1 - \cos \omega \Delta) + A \cos \omega t \sin \omega \Delta \qquad (3)$$

Assuming that $\Delta$ is sufficiently small to satisfy the requirement $\omega \Delta \ll 1$, equation (3) is approximated by:

$$E_i \cong A \omega \Delta \cos \omega t \qquad (4)$$

where $\omega$ is the frequency of the analog input signal. Thus, the voltage at the input terminals to the comparator is effectively a gain factor ($\Delta$) times the derivative of the analog input signal. From equations (4) and (1), it is evident that during the time $\cos \omega t$ is positive (and the comparator output is in its high state), the analog input voltage waveform $\sin \omega t$ has a positive slope, and thus the circuit of FIG. 1 functions as a positive slope detector.

The requirement that ($\omega \Delta$) is much less than one is satisfied by limiting the time delay $\Delta$ to less than 0.05 times the period of one cycle of the analog input signal.

Figure 2:
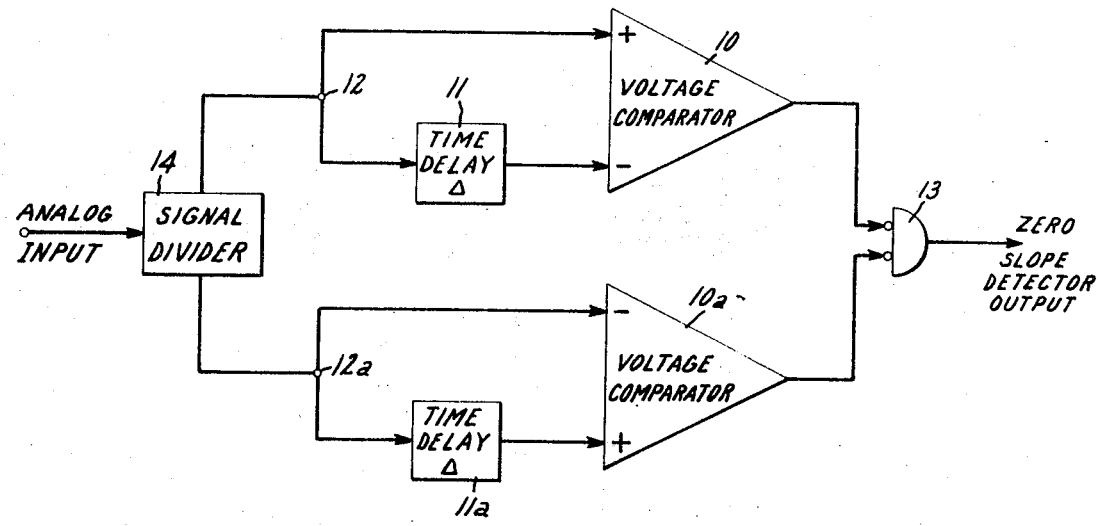
FIG. 2 is a simplified block diagram of my zero slope detector.

A circuit which produces a high state (binary logic ONE) output signal whenever the derivative of an analog input voltage waveform becomes zero, that is, a zero slope detector, is accomplished by utilizing two polarity slope detectors of the type illustrated in FIG. 1. FIG. 2 illustrates my zero slope detector wherein a positive slope detector including voltage comparator 10 and time delay network 11 (the identical circuit of FIG. 1) is interconnected with a negative slope detector including an identical voltage comparator 10a and an identical time delay network 11a. The negative slope detector is obtained by supplying the analog input signal directly to the (—) input terminal of voltage comparator 10a, and through the time delay network 11a to the (+) input terminal.

Figure 5:
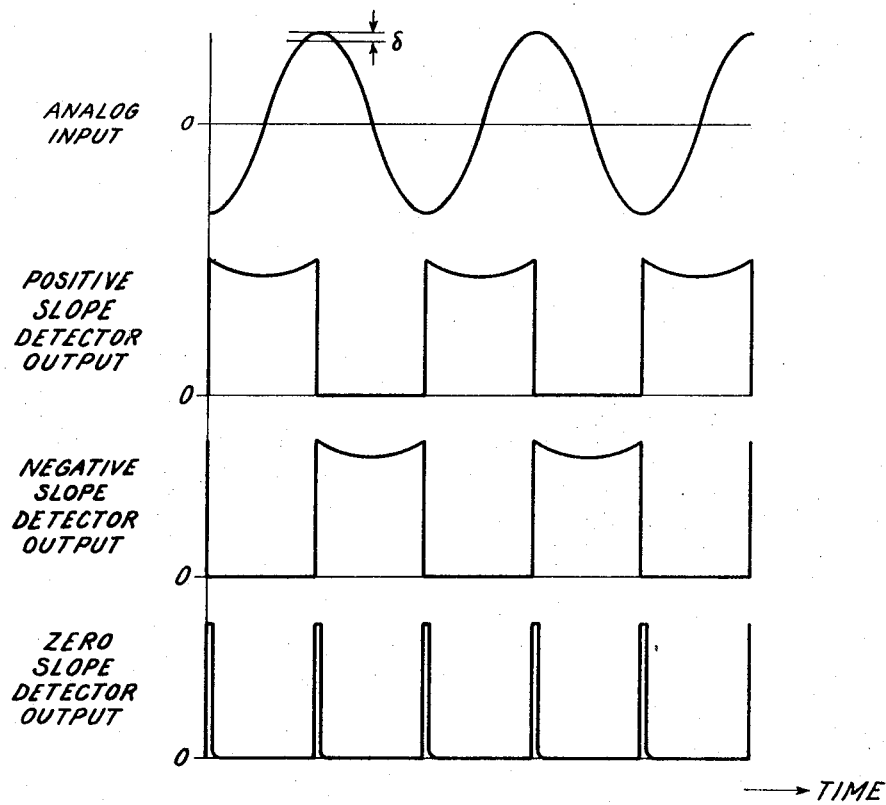
FIG. 5 illustrates a series of waveforms of the voltages in various parts of the zero slope detector.

Before describing the rest of the zero slope detector, it should be noted that voltage comparators have finite offset voltages δ characteristics associated with the point at which the change state as indicated in the region of the maximum amplitude points of the analog input voltage waveform of FIG. 5. This offset voltage characteristic produces very short intervals of time when neither of the positive and negative polarity slope detector outputs will be in the high state, i.e., the derivative must achieve a finite magnitude before the polarity indication is achieved. However, a suitable binary logic gate element 13 having its two inputs connected to the outputs of voltage comparators 10 and 10a is capable of detecting the simultaneous low state outputs of the comparators and developing pulses in response thereto. Thus, as indicated in the waveforms of FIG. 5, the output of logic gate 13 (zero slope detector output) consists of a pulse occurring at the time that the voltage comparators' outputs are each in their low state (i.e. neither a positive nor negative slope exists), that is, the logic gate output pulses are centered at the points of zero slope of the analog input voltage waveform supplied to the input junctures 12 and 12a. A signal divider circuit 14 is preferably used at the input of the two slope detector circuits to isolate the inputs thereof from each other and thereby prevent any possible coupling effects that might be produced during the switching of the states of the comparators.

The offset voltage δ associated with the positive and negative slope detector circuits is assumed to be identical. There will then be a pulse produced at the output of the zero-slope detector (output of logic gate 13) whenever the offset voltage level δ is not exceeded at the input to either comparator, and the output pulse width τ is found to be:

$$\tau = 2\delta/A\omega^2\Delta \qquad (5)$$

It should be noted that τ is inversely proportional to both analog input signal amplitude A and time delay Δ as would be expected, and is inversely proportional to the analog input signal frequency δ squared, and directly proportional to the offset voltage δ.

A schematic diagram of the positive slope detector illustrated in FIG. 1, but showing more details, is illustrated in FIG. 3. The time delay network 11 is indicated in FIG. 3 as consisting of a series resistor 30 and a capacitor 31 shunted to ground and connected to the juncture of resistor 30 and the negative input terminal of the voltage comparator. Since the time delay produced by the time delay network is less than 0.05 times the period of one cycle of the analog input voltage waveform, the series resistor 30 must have a relatively small resistance value, and thereby produces only a small attenuation of the input signal. In addition, a second series resistor 32 having a resistance value equal to that of resistor 30 is connected between juncture 12 and the positive input terminal of the comparator to equalize the attenuation developed by resistor 30 in the negative input circuit of the comparator. Obviously, such second resistor would also be employed in the negative input circuit of a more detailed schematic diagram of the negative slope detector illustrated in FIG. 2.

FIGS. 4 and 4A illustrate a detailed schematic diagram of a specific embodiment of my zero slope detector as shown generally in block diagram form in FIG. 2. The positive slope detector circuit, illustrated as a whole by numeral 40, and the negative slope detector by numeral 41, are seen to include the elements shown in FIG. 3 with the addition of small capacitors 42, 42a shunted to ground and connected to the junctures of the equal resistance value series resistor 32, 32a and input terminals of the voltage comparators. The shunt capacitor 42 in the positive slope detector 40 and the shunt capacitor 42a in the negative slope detector 41 are of equal value capacitance and function to bypass any high frequency switching transients generated by the comparators during changes of state. Identical time delay networks are produced from the equal resistance value resistors 30 and 30a and equal capacitance value capacitors 31 and 31a employed.

The signal divider circuit 14 indicated in block diagram form in FIG. 2 preferably comprises a pair of identical unity gain operational amplifiers 43 and 43a although other devices such as resistive dividers can be used if sufficient signal amplitude exists at the input to the slope polarity detectors. The unity gain is obtained by using equal resistance value resistors in the signal input and negative feedback circuits of each operational amplifier. Thus, resistors 44 and 45 in the signal input and negative feedback circuits, respectively, of operational amplifier 43 have equal resistance values which are also equal to the resistance values of signal input and negative feedback resistors 44a and 45a in operational amplifier 43a. The input end of resistors 44 and 44a are connected to a juncture 46 to which is supplied the analog input signal to be monitored by the zero slope detector. Small capacitors 47 and 47a are also connected in the negative feedback circuits of the operational amplifiers for the conventional purpose of internal high-frequency gain compensation.

In the specific case wherein logic gate 13 is a NAND gate, as illustrated, and for the particular NAND gate employed, elements 50 and 51 are connected between the outputs of comparators 10, 10a and the input to such particular NAND gate 13 for inverting the output of the comparators since the particular NAND gate employed will only change state when both inputs are logic ONE levels. Elements 50, 51 serve a secondary function of sharpening the edges of the pulse outputs of the comparators. Elements 50, 51, as well as element 52 connected to the output of gate 13 for signal inversion purposes, may each be of the identical type as NAND gate 13. Logic gate 13 may also be an AND gate, but again would require inverters 50, 51. Other types of logic circuitry may also be utilized to accomplish the function of detecting the simultaneous low states of comparators 10, 10a.

The power supply for the zero slope detector is illustrated in FIG. 4A wherein a power supply filter of the capacitance type is utilized in each of the positive and negative voltage power supply units. For the particular operational amplifiers and voltage comparators to be hereinafter defined, a power supply voltage of +12 volts is utilized for each operational amplifier and voltage comparator, a voltage of −12 volts for the operational amplifiers, and a voltage of −6 volts for the voltage comparators and is obtained from the juncture of a voltage dropping resistor 48 and a zener diode 49 which are serially connected between the −12 voltage output terminal and ground.

In one specific embodiment of my zero slope detector as illustrated in FIGS. 4 and 4a, the operational amplifiers and voltage comparators are integrated circuits of the type LM201 and 710C, respectively, and the NAND gates 13, 50, 51, 52 are of the type MC846, all being of conventional design. Resistors 30, 30a, 32 and 32a are each of 82 ohms resistance and capacitors 31 and 31a are each of 0.47 microfarads capacitance to produce an RC product of approximately 40 × 10⁻⁶. Capacitors 42 and 42a are each of 0.001 microfarads capacitance. The operational amplifier resistors 44, 44a, 45 and 45a are each of 3,300 ohms resistance and the feedback capacitors 47 and 47a are each of 30 picofarads. Power supply filter capacitors 53 and 54 are each of 10 microfarads capacitance and capacitors 55 and 56 are each of 0.01 microfarad capacitance. Resistor 48 is of 200 ohms resistance and zener diode 49 is of the type 1N753.

The minimum-to-maximum peak-to-peak voltage range of the analog input signal supplied to juncture 46 for the particular operational amplifiers and voltage comparators hereinabove defined is 100 millivolts to 10 volts. The magnitude of the high state output of the 710C voltage comparators and the MC846 NAND gates is approximately 5 volts. In the case of a 1-kilohertz analog input frequency signal, the pulse width at the output of the zero detector circuit is approximately 50 microseconds.

From the foregoing description, it can be appreciated that my invention makes available an improved electrical circuit for determining the polarity of the slope of an analog input voltage waveform, and in conjunction with a second such circuit determines the zero slope or peak amplitude point of such waveform. The circuit is adapted for monitoring many types of analog input voltage waveforms (i.e. is not limited to sine wave forms and includes multi-level pulse amplitude modulation types) provided the frequency thereof is sufficiently low whereby the time delay network in the voltage comparator input circuits provides a time delay less than 0.05 times the period of one cycle of the input voltage waveform. Although the particular circuit constants recited for the FIG. 4 circuit are for a narrow band application, my circuit is also applicable to wider band applications by shortening the time constant of delay network 11. The frequency bandwidth of my circuit is limited primarily by the speed of response of the comparators and the bandwidth of the time delay networks. My invention is defined by the following claims.

What I claim as new and desire to secure by Letters Patent of the United States is:

1. An electrical circuit for detecting the slope polarity of an analog input voltage waveform comprising
    a first differential voltage comparator provided with first positive and first negative inputs,
    said first positive input adapted to be supplied with an analog input voltage signal,
    said first negative input including a first electrical fixed time delay network continuously providing a sufficiently small fixed time delay $\Delta$ such that $\omega \Delta$ is less than 1.0 where $\omega$ is the frequency of the analog input signal in radians per second, said first fixed time delay network is comprised of elements having particular values of resistance and reactance to provide a fixed time delay less than 0.05 times the period of one cycle of the input signal, said first negative input adapted to be continuously supplied with the analog input voltage signal in substantially undistorted form and merely being delayed by the time delay $\Delta$ from the undelayed signal applied to said first positive input upon passage through said first time delay network whereby said first comparator provides a continuous comparison of the amplitudes of the undelayed and delayed analog input voltage signal,
    the output of said first comparator being a binary logic voltage signal wherein the high state thereof corresponds to the time of positive polarity of the slope of the waveform of the analog input voltage signal.

2. The electrical circuit set forth in claim 1 wherein
    said first time delay network comprises a first series resistor having a resistance value R and a reactive element, and
    said first positive input includes a second series resistor having an equal resistance value R to compensate for slight attenuation in amplitude of the input signal in its passage through said first time delay network.

3. The electrical circuit set forth in claim 2 wherein
    said reactive element is a capacitor and said first time delay network comprises a single section resistor-capacitor network.

4. The electrical circuit set forth in claim 3 wherein
    said capacitor is connected between ground and a juncture interconnecting one end of said first series resistor with said first negative input of said first comparator.

5. The electrical circuit set forth in claim 4 and further comprising
    a small capacitance capacitor connected between ground and a juncture interconnecting one end of said second series resistor with said first positive input of said first comparator for bypassing high frequency switching transients generated by said first comparator during changes of state thereof.

6. The electrical circuit set forth in claim 1 and further comprising
    a second differential voltage comparator provided with second positive and second negative inputs,
    said second negative input adapted to be supplied with the analog input voltage signal,
    said second positive input including a second fixed time delay network providing a sufficiently small and equal fixed time delay $\Delta$ such that $\omega \Delta$ is less than 1.0, said second positive input adapted to be supplied with the analog input voltage signal in substantially undistorted form and merely being delayed by the time delay $\Delta$ from the undelayed signal applied to said second negative input upon passage through said second time delay network whereby said second comparator provides a continuous comparison of the amplitudes of the undelayed and delayed analog input voltage signal,
    the output of said second comparator being a binary logic voltage signal wherein the high state thereof corresponds to the time of negative polarity of the slope of the waveform of the analog input voltage signal, and
    a first binary logic gate having a first input connected to the output of said first comparator and a second input connected to the output of said second comparator, the output of said first logic gate being a short duration pulse occurring each time the slope of the waveform of the analog input voltage signal becomes zero.

7. The electrical circuit set forth in claim 6 and further comprising
    means for electrically isolating the inputs of said first voltage comparator from the inputs of said second voltage comparator.

8. The electrical circuit set forth in claim 7 wherein
    said electrical isolating means comprises
    a first electronic operational amplifier having a first input connected to a first juncture supplied with the analog input voltage signal,
    the output of said first operational amplifier connected to a second juncture which supplies the analog input voltage signal to said first positive and negative inputs of said first voltage comparator,
    a second electronic operational amplifier having a first input connected to said first juncture and the output connected to a third juncture which supplies the analog input voltage signal to said second positive and negative inputs of said second voltage comparator.

9. The electrical circuit set forth in claim 8 wherein
    said first and second operational amplifiers each have equal value resistances in the first inputs thereof and the same equal value resistances in negative feedback circuits thereof to thereby provide unity voltage gain.

10. The electrical circuit set forth in claim 9 and further comprising
    a second binary logic gate connected between the output of said first comparator and the first input of said first logic gate, and
    a third binary logic gate connected between the output of said second comparator and the second input of said first logic gate.

11. The electrical circuit set forth in claim 10 and further comprising
    a fourth binary logic gate connected to the output of said first logic gate, said second and third logic gates functioning to sharpen the edges of the pulse outputs of said comparators, and said fourth logic gate providing a sign reversal for the pulse output of said first logic gate.

* * * * *